Figure 1:
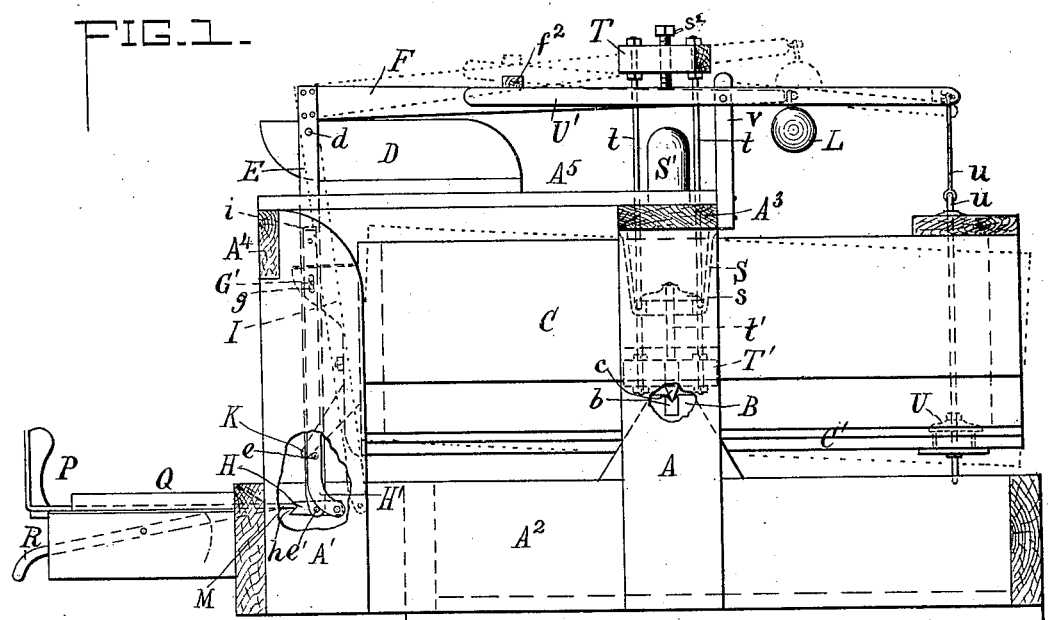

No. 647,090. Patented Apr. 10, 1900.
F. HANDY.
LIQUID WEIGHING MACHINE.
(Application filed June 29, 1899.)
(No Model.) 2 Sheets—Sheet 1.

WITNESSES
W. R. Allen
Chas. W. Parker

INVENTOR
Fred Handy
By R. S. Bacon
Attorney

No. 647,090. Patented Apr. 10, 1900.
F. HANDY.
LIQUID WEIGHING MACHINE.
(Application filed June 29, 1899.)
(No Model.) 2 Sheets—Sheet 2.

WITNESSES

INVENTOR
Fred Handy
By R. S. Bacon
Attorney

UNITED STATES PATENT OFFICE.

FRED HANDY, OF NORTH ANDOVER, WISCONSIN.

LIQUID-WEIGHING MACHINE.

SPECIFICATION forming part of Letters Patent No. 647,090, dated April 10, 1900.

Application filed June 29, 1899. Serial No. 722,293. (No model.)

*To all whom it may concern:*

Be it known that I, FRED HANDY, a citizen of the United States, residing at North Andover, in the county of Grant and State of Wisconsin, have invented certain new and useful Improvements in Liquid-Weighing Machines; and I do hereby declare the following to be a full, clear, and exact description of the invention, such as will enable others skilled in the art to which it appertains to make and use the same.

This invention relates to an improvement in milk-weighing machines; and it is embodied in the construction and arrangement of parts hereinafter described, and defined in the claims.

The invention is designed for the purpose of permitting individuals to deposit a check and thereafter, upon the proper manipulation of suitable mechanism, cause a predetermined amount of milk to be weighed and delivered. Such machines are particularly useful in connection with dairies where blue or skimmed milk is returned to the farmers or parties selling the new milk in proportion to the amount of milk originally delivered, the proportion being represented by a check.

While the machine is intended for use in connection with milk, it is obvious that it can be used with success in weighing and delivering other liquids.

In the drawings is shown an apparatus for the purpose above indicated and which represent a practical embodiment of the invention. I desire it understood, however, that the form and arrangement shown are susceptible of various changes and modifications without departing from the nature and principle of the invention.

Figure 2:
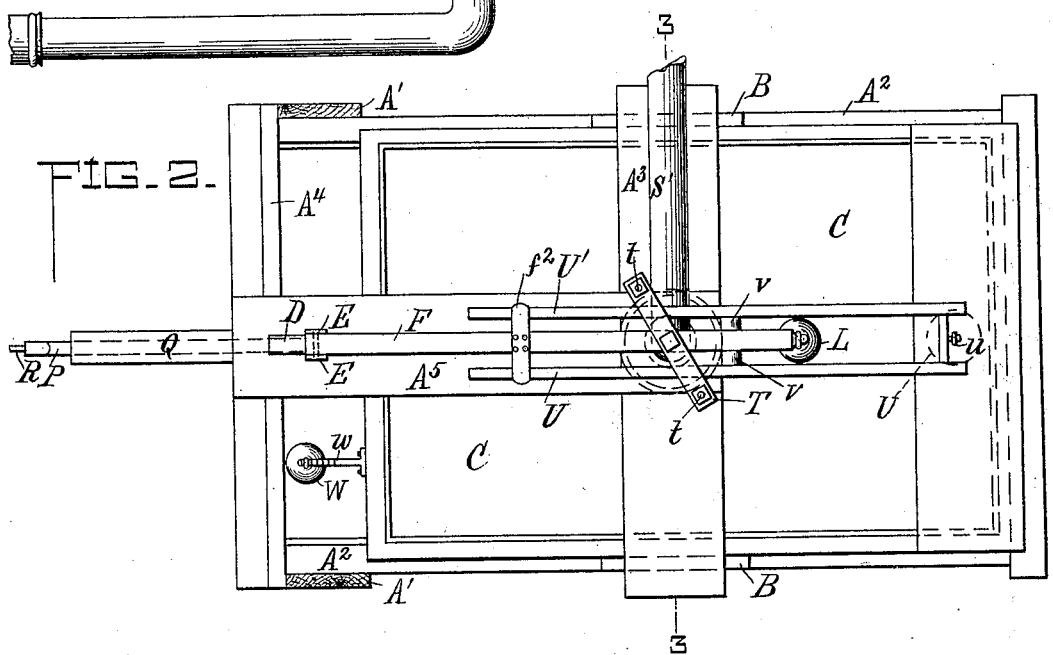
Figure 3:
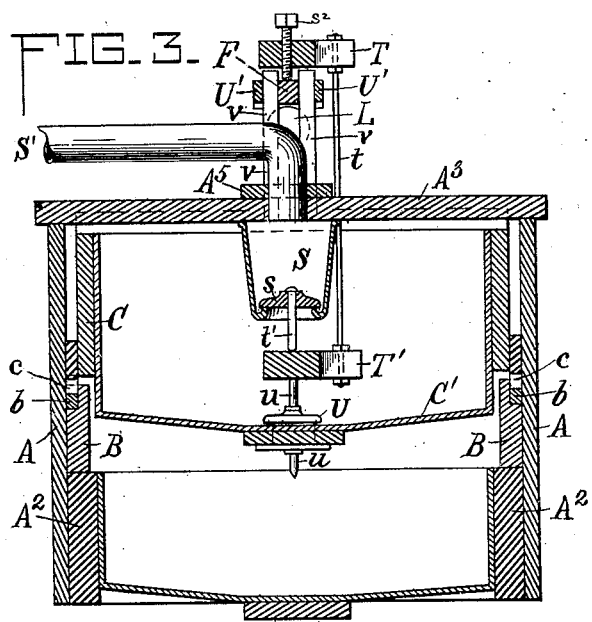
Figure 4:
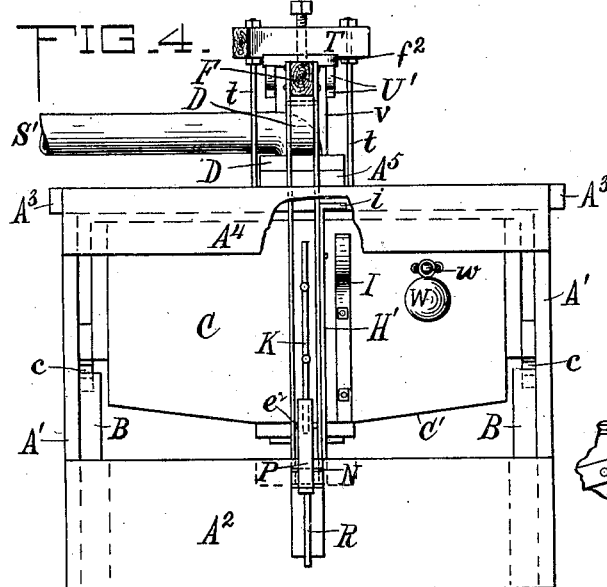
Figure 5:
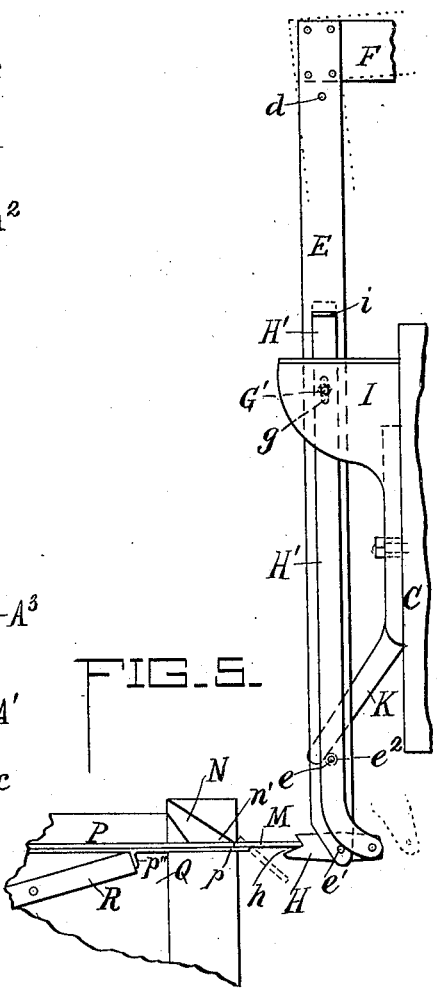

In the drawings, Figure 1 is a side elevation showing parts of the frame in section. Fig. 2 is a top plan view. Fig. 3 is a cross-section on lines 3 3 of Fig. 2. Fig. 4 is an end view, and Fig. 5 is an enlarged detail view of the regulating mechanism.

A A' designate suitable uprights supported on a base $A^2$ and connected transversely by cross-braces $A^3$ $A^4$, which latter are connected centrally by a longitudinal plank or platform $A^5$, the whole constituting the stationary framework of the machine.

B designates two bearing-blocks secured at the sides of the uprights A, each having sockets in their upper edges in which suitable metallic bearings $b$ are secured, upon which the tilting weighing tank or receptacle C is supported. The tank C is conveniently rectangular in shape and has a hopper-shaped bottom C'. On the sides of the tank at points slightly in advance of its longitudinal center are the knife-edge-supporting lugs $c$, fitting the bearings $b$ of the blocks B. These supports and bearings are so arranged that the tank has a free tilting movement in either direction.

On the top of the platform $A^5$ is secured a fulcrum-block D, to the forward end of which is pivotally secured by fulcrum-pin $d$ the vertical lever E, which extends downward in front of the tank to a point below the latter. The lever E is made of two parallel bars spaced apart, their upper ends extending above fulcrum-block D and being rigidly secured to the horizontal lever F, which extends rearward to a point beyond the center of the tank. These two levers E F, with their rigid connections, constitute, in effect, a bell-crank lever, the vertical arm of which moves toward the tank as the horizontal arm is tilted up, and vice versa. The lower ends of the bars of lever E are united by two bolts or pins $e$ $e'$, the former carrying a loose collar $e^2$, which acts as an antifriction-roll, while the lower pin or bolt carries a tiltable dog H, which is mounted centrally on the pin and extends in opposite directions beyond the edges of the bars of lever E. The forward end of this dog H has a check-receiving notch $h$ formed therein, and the rear end is pivotally secured to a trip-bar H', which has its lower pivoted end curved backward beyond the edge of the lever-arm E, while its body portion is carried up along the side of the lever-arm E and has an elongated slot $g$ therein, through which a pin G' on the lever E passes. By this means the trip-bar has a limited vertical movement independent of the lever-arm E.

Secured to the center of the forward end of the tank C is an inclined stop K, projecting outward and downward and between the two bars of lever-arm E. This stop is so placed that it will normally rest against the anti-friction-roll of pin e for purposes presently stated.

On the end of the tank is secured a forwardly-extending bracket I, the upper end of which is located below an offset or projection i on the trip-bar H', so that as the bracket is moved up the same will engage the projection.

As stated, the tank is journaled eccentrically, the bearings being in advance of the center thereof. This necessarily results in the forward end of the tank being normally elevated. To counteract this, a counterbalance or weight W is secured on a beam w, which extends outward from the front of the tank. The weight W is such as to overcome the overbalancing-weight of the rear end of the tank and to normally elevate the same. This downward-tilting movement of the forward end is checked or regulated by the stop K engaging the roll on pin e. To overcome the tendency of the weight W to force the lever-arm E in owing to the inclination of stop K, a weight L is secured on the rear end of the horizontal arm F of the bell-crank. This weight L has a tendency and is sufficient to force the arm E out against the weight-pressure of the weight W, and this outward movement is checked by the checks M, employed with the machine. These checks M are of varying lengths, each length representing a certain amount of milk. They are inserted through an incline slot N in the base into a horizontal passage-way $n'$, into which the slot leads.

P designates a hand-operated slide working in suitable ways formed in a bracket Q. This slide has a flange p on its under face, which works in a groove in the lower wall of the passage $n'$. The end of the flange projects beyond the end of the slide P and serves as a support for the check.

R designates a pivoted locking-bar mounted in the bracket Q, its rear end arranged to engage a shoulder $p''$ on the slide P when the latter is forced in. When this check is deposited, the slide is forced in, carrying the rear end of the check into the check-receiving groove of the dog H, which latter is held normally in a horizontal position by the weight of the trip-bar H', which latter is allowed to move down by its pin-and-slot connections only far enough to carry the dog to the horizontal position. The slide is then caught by the locking-bar R and its retrograde movement prevented. The check and slide thus hold the weighted bell-crank in position.

Suspended from the under side of cross-bar $A^3$ is a hopper S, having an upwardly-moving valve s in its bottom. Into this hopper the supply-pipe S' leads. The valve s is normally closed by its weight and the weight of the fluid above it, but is raised to allow the milk to enter the tank by the horizontal arm F of the bell-crank. For this purpose a cross-head T is arranged above the arm F and carries two depending rods t, which enter the tank and carry at their lower ends the cross-bar T', located below the hopper. On the bar T' rests a pin $t'$, connected with the valve s, so that as the lever-arm F moves up the valve is moved up from its seat. To regulate the movement of the valve, a set-bolt $s^2$ is pressed through cross-head T, the same engaging the arm F.

In the rear of the tank is a discharge-opening, which is governed by a weighted valve U, suspended from a lever U' by a suitable rod u. The lever U' is fulcrumed on a standard v on the cross-bar $A^3$ and is formed of two parallel bars secured together. The lever-arm F carries a cross-block $f^2$, which extends over the forward ends of the bars of lever U' and serves to regulate the movement of the valve U by the position of the bell-crank.

Below the tank is a suitable receiving-box, from which a discharge-pipe leads.

In operation a check is placed in the slot, the operator forcing the same inward, thereby moving the bell-crank so that its vertical arm will be at an incline, allowing the weight W to carry the forward end of the tank down until the stop engages the roller on the pin e. This movement of the bell-crank raises the inlet-valve, as described, and allows the milk to flow in until the accumulation in the longer portion of the tank overcomes the weight of that in the forward part of the tank and also that of weight W. The tank will then tip down and in doing so the bracket on the tank strikes the projection on the trip-bar H' and raises the latter, which tilts the dog H, thereby throwing the check out and allowing the weight L to carry the bell-crank into its normal position, in which position the weight L prevents the tank tipping back by the lower end of the stop engaging the roll on pin e. As the arm F descends it serves to hold the lever U' in position, so that the tank moves down, leaving the valve U stationary and permitting the milk to escape.

By securing valve U to the lever U' the tank can be tilted by the weight W without affecting the position of valve U relative to its seat.

Having thus described my invention, what I claim as new, and desire to secure by Letters Patent, is—

1. In a liquid-weighing machine, the combination with a supporting-frame, of a tilting receptacle having eccentric-bearings, a weight for carrying one end of the receptacle down, against the overbalancing weight of the opposite end, means for limiting the downward movement of the weighted end of the receptacle, a lever acting in conjunction with said limiting means to hold the receptacle in position, and detachable means for adjusting the position of the lever, substantially as described.

2. In a liquid-weighing machine, the combination with an eccentrically-pivoted receptacle, having its underbalanced portion weighted to overbalance the opposite end, a pivoted lever, an inclined stop interposed between the receptacle and lever, and means comprising a detachable member, for varying the relative position between the lever and stop.

3. In a liquid-weighing machine, the combination with an eccentrically-supported receptacle having its underbalanced end weighted to overbalance the opposite end, a lever, a stop, means for changing the relative position between the lever and stop to vary the down movement of the weighted end of the receptacle, a supply, a valve for governing the same, and means for opening the valve upon the adjustment of the lever, substantially as described.

4. In a liquid-weighing machine, the combination with an eccentrically-mounted receptacle having a weighted underbalanced end, an inclined projection on the receptacle, a swinging lever with which the projection engages, and movable means comprising holding instrumentalities and a slide for varying the relative position of the projection and lever, substantially as described.

5. In a weighing-machine, the combination with an eccentrically-mounted receptacle having a weighted underbalanced end, means for limiting the downward movement of the weighted end, means for adjusting said limiting means, and mechanism for removing said adjusting means upon the tilting of the receptacle, substantially as described.

6. In a liquid-weighing machine, the combination with an eccentrically-mounted weighing-receptacle having a weighted underbalanced end, adjustable means for limiting the downward movement of the weighted end of the receptacle, and a trip for releasing said adjustable holding means, actuated upon the upward movement of the weighted end of the receptacle.

7. In a liquid-weighing machine, the combination with an eccentrically-mounted receptacle having a weighted underbalanced end, of movable means for retaining the receptacle at different inclinations, and a trip acting upon the final tilting movement of the receptacle for releasing the adjustable retaining means, substantially as described.

8. In a liquid-weighing machine, the combination with a pivoted receptacle, of means for holding the same at different inclinations and a supply-valve actuated by said holding means.

9. In a liquid-weighing machine, the combination with a pivoted receptacle, of means for holding the same at different inclinations, holding instrumentalities for retaining the holding means in place, and a trip for releasing the holding instrumentalities upon the final movement of the receptacle.

10. In a liquid-weighing machine, the combination with a pivoted receptacle, a stop on the receptacle, a pivoted bell-crank having a projection with which the stop engages, a weight on the bell-crank, a slide and a movable means between the slide and bell-crank for retaining the bell-crank in its adjusted position relative to the stop, substantially as described.

11. In a liquid-weighing machine, the combination with a pivoted receptacle, of a swinging lever adjacent thereto, an inclined stop on the receptacle engaging a projection on the lever, detachable means for changing the relative position between the lever and stop and retaining the same in such position, a trip, a projection on the receptacle for actuating the trip, and a supply-valve actuated upon the movement of the lever, substantially as described.

12. In a liquid-weighing machine, the combination with a pivoted tank, of a supply leading to the tank, a valve for governing the supply, a bell-crank adjacent to the tank, an actuating connection between the bell-crank and valve, means for adjusting the bell-crank to actuate the valve comprising a detachable member, and a trip actuated by the movement of the receptacle to release the member to permit the valve to close, substantially as described.

13. The combination with a tank having a stop therein, of a swinging lever with which the stop engages, a slide, a detachable member actuated by the slide for changing the positions between the lever and stop and means for holding the slide in its set position.

14. The combination with a tank, of the inclined stop thereon, a swinging lever having a projection with which the stop engages, a vertically-movable tripping-bar carried by the lever, a dog, pivoted to the bar and lever, a projection on the tank for engaging the bar to tilt the dog, a slide, a detachable member interposed between the slide and dog for holding the lever in its adjusted position, and means for holding the slide in its adjusted position, substantially as described.

15. In a milk-weighing machine, the combination with an eccentrically-pivoted tank having its underbalanced end weighted to overbalance the opposite end, a pivoted lever adjacent the tank, a stop on the tank engaging the lever for limiting the downward movement of the weighted end of the tank, a removable setting device for the lever, a valved supply, means actuated by the lever for governing the valve, an outlet-valve, a lever supporting the same, and a connection between the supporting-lever and said other lever, substantially as described.

16. The combination with a frame, of an eccentrically-pivoted tank mounted therein, a weight on the short arm of the tank, adjustable means for limiting the downward movement of the short arm of the tank, a valved supply, means connected with said limiting means for governing the valve upon the movement of the tank, and a discharge-valve, substantially as described.

17. The combination with a tank having a weighted end, an inclined stop thereon and a bracket, of a pivoted bell-crank having a projection with which the stop engages, a trip-bar slidingly mounted on the bell-crank having a projection with which the bracket engages, a detachable member, a slide, a pivoted dog connected with the lever and trip for holding the detachable member, a weight on the bell-crank, a valved supply, a connection between the valve and bell-crank, and a discharge-valve in the tank, substantially as described.

In testimony whereof I affix my signature in presence of two witnesses.

FRED HANDY.

Witnesses:
M. F. WOODHOUSE,
J. L. MORKIN.